United States Patent [19]
Vincent et al.

[11] Patent Number: 5,999,682
[45] Date of Patent: Dec. 7, 1999

[54] TOOL FOR CONNECTING A FIBER TO ANOTHER FIBER OR TO AN OPTICAL CONNECTOR MEMBER BY MEANS OF A CONNECTION MODULE

[75] Inventors: Alain Vincent, Juilly; Michel Reslinger, Bondoufle; Gérard Godard, Noiseau; Philippe Laurency, Colombes, all of France

[73] Assignee: Alcatel, Paris, France

[21] Appl. No.: 08/998,840

[22] Filed: Dec. 29, 1997

[30] Foreign Application Priority Data

Dec. 30, 1996 [FR] France .................................. 96 16188

[51] Int. Cl.⁶ ....................................................... G02B 6/00
[52] U.S. Cl. .............................................. 385/134; 385/98
[58] Field of Search ........................................ 385/98, 134

[56] References Cited

U.S. PATENT DOCUMENTS 4,046,298  9/1977  Schroeder ................................. 385/114
4,416,506  11/1983  Johnson et al. .

FOREIGN PATENT DOCUMENTS

0509737A2  10/1992  European Pat. Off. .
2614142A1  10/1988  France .

*Primary Examiner*—Rodney Bovernick
*Assistant Examiner*—Robert E. Wise
*Attorney, Agent, or Firm*—Sughrue, Mion, Zinn, Macpeak & Seas, PLLC

[57] ABSTRACT

A tool is used for end-to-end jointing a fiber to another fiber or to an optical connector end-piece by means of a module including a receiving housing enabling a fiber to be inserted at one end at least and wedging action arrangements for fixing the fibers at the bottom of the housing that are operated by pressing them in. The tool carries out the following operations successively and possibly simultaneously for two fibers: partial stripping of each fiber, end cleavage for end-to-end jointing, positioning of each cleaved fiber in the module where it is jointed and crimping of each fiber in a jointing position in the module. These operations are carried out in a cycle commanded by continuous rotation in a particular direction of a rotary drive shaft of the tool after manual fitting of each fiber and the module at particular positions on the tool.

17 Claims, 10 Drawing Sheets

FIG_1

FIG_2

FIG_3

FIG_4

FIG_5

FIG_6

FIG_7

FIG_8

FIG_12

FIG_13

FIG_14

FIG_15

FIG_16

FIG_17

FIG_18

FIG_19

FIG_20

FIG_21

TOOL FOR CONNECTING A FIBER TO ANOTHER FIBER OR TO AN OPTICAL CONNECTOR MEMBER BY MEANS OF A CONNECTION MODULE

BACKGROUND OF THE INVENTION

1. Field of the Invention

The invention concerns a tool for carrying out all of the operations for end-to-end jointing a fiber either to another fiber or to an optical connector member by means of a connection module including a receiving housing enabling a fiber to be inserted at one end at least and wedging action means for fixing the fibers at the bottom of the housing which are operated by pressing them in.

2. Description of the Prior Art

Butt jointing one or two optical fibers entails delicate operations including in particular shaping the end of each fiber to be end-to-end jointed, accurately positioning the end(s) to assure high quality optical continuity and fastening each fiber after appropriate positioning.

The use of jointing modules and in particular splicing modules for accurately positioning fibers to be butt jointed and fastening of the fibers after positioning is known in itself.

However, connecting fibers by means of such modules does not eliminate the preliminary operations referred to above, although these modules can facilitate some of them.

SUMMARY OF THE INVENTION

The invention therefore proposes a tool for end-to-end jointing a fiber to another fiber or to an optical connector end-piece by means of a module including a receiving housing enabling a fiber to be inserted at one end at least and wedging action means for fixing the fibers at the bottom of the housing that are operated by pressing them in, including means for carrying out successively and possibly simultaneously for two fibers partial stripping of each fiber, end cleavage for end-to-end jointing, positioning of each cleaved fiber in the module where it is jointed, and crimping of each fiber in a jointing position in said module, in a cycle commanded by continuous rotation in a particular direction of a rotary drive shaft of said tool, after manual fitting of each fiber and of said module at particular positions on said tool.

The invention, its features and its advantages are explained in the following description referring to the following drawings.

BRIEF DESCRIPTION OF THE DRAWINGS

FIGS. 1 through 4 respectively show a sectional front view, a righthand side view, a sectional lefthand side view and a top view of a receiving housing of one example of a jointing module adapted to be installed by means of a tool in accordance with the invention.

FIGS. 5 through 8 are respectively a bottom view, a sectional front view, a sectional righthand side view and a lefthand side view of an immobilizing member from the module shown in FIGS. 1 to 4.

FIGS. 9, 10, 11 are slightly different front views of a tool in accordance with the invention.

FIGS. 13 and 14 are respectively a lefthand side view and a top view of a clamping arrangement for a tool in accordance with the invention.

FIGS. 17 and 18 are respectively a lefthand side view and a top view of one of the cleaving arrangements for tools in accordance with the invention.

FIGS. 19, 20, 21 are respectively a front view, a lefthand side view and a bottom view of one example of a module-holder for tools in accordance with the invention.

DETAILED DESCRIPTION OF THE PREFERRED EMBODIMENT

As mentioned above, the tool of the invention is for end-to-end jointing an optical fiber either to another optical fiber or to an optical connector member by means of a jointing module including a receiving housing which allows a fiber to be inserted from one end at least and wedge action means for fixing the fibers at the bottom of the housing that are operated by pressing them in.

FIGS. 1 through 8 show one non-limiting example of a end-to-end jointing module, in this instance a module for splicing two fibers, together with its immobilizing member.

Figure 11:
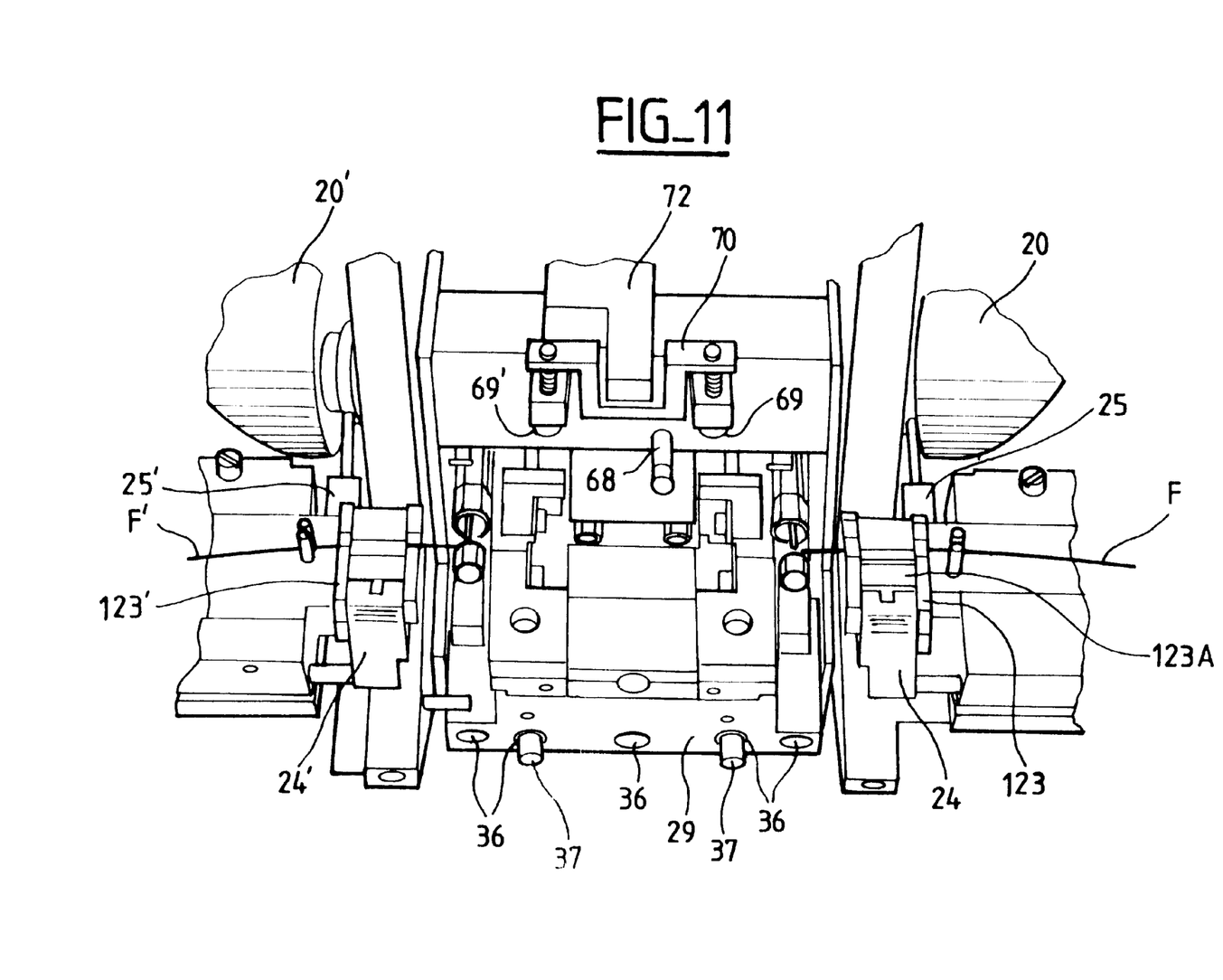

To this end the module includes a receiving housing 1 adapted to receive two fibers and an immobilizing member 2 (see FIG. 6) adapted to cooperate with the receiving housing 1 to hold two optical fibers F, F' shown schematically in FIG. 11 in position after they have been positioned end-to-end to assure satisfactory optical continuity between the fibers.

The receiving housing 1 is molded from a material such as a thermoplastics resin and has a rectangular parallelepiped shape with a longitudinal cavity open on one of its larger faces to receive a part 3 of the immobilizing member 2.

The bottom of the cavity in the receiving housing 1 has a longitudinal central groove 4 (see FIG. 5) to receive two fibers to be end-to-end jointed which enter this cavity via orifices 5 in opposite lateral walls of the housing (see FIG. 5) at the level of the bottom of the cavity and each at one end of the groove 4.

Because of its inherent shape, or possibly because of the shape of an end-piece that it receives, each orifice 5 widens towards the outside of the housing to facilitate the entry of a fiber and has a particular diameter in the part which extends towards the interior of the cavity for correct centering of the end to be jointed of a fiber of given diameter, the diameter of the orifices or of the end-pieces that they contain possibly being chosen according to those of the fibers to be jointed. The latter are adapted to end-to-end jointed together in the middle part of the longitudinal groove 4.

The receiving housing 1 further includes means for fixing the immobilizing member 2 in a first position allowing free passage of the fibers in the groove 4 between the bottom of this groove and the immobilizing member 2 or in a second position in which the immobilizing member presses onto the bottom of the groove 4 any fiber portion inserted between itself and this groove.

Here these means are disposed transversely to the ends of the housing, externally of the latter, and are in the form of projecting detents 6, 6' which are offset in height and in width in the embodiment shown. The detents 6 at opposite ends of the housing and at the same height are for attaching the immobilizing member to the receiving housing in the first of the positions mentioned above. The detents 6' at a lower level than the detents 6 are for holding the immobilizing member in the second of these positions relative to the receiving housing.

In the embodiment shown each detent 6 is narrower than the detent 6' below it and is offset laterally relative to it, as can be seen in FIG. 2.

The immobilizing member 2 is made from the same material as the receiving housing 1, for example, and has a part 3 (see FIG. 6) which is here used to apply pressure to the portions of fiber inserted via the orifices 5 between itself and the groove 4 of a receiving housing 1 to hold them in position when the immobilizing member 2 including it is pushed into the second of the positions mentioned above relative to the receiving housing 1 to which it is fitted.

In the embodiment shown, the pressing part 3 has a shape complementary to that of the cavity in the receiving housing 1 which receives it, i.e. a rectangular parallelepiped shape in this instance. It is fixed to a cap 7 which closes the cavity in the receiving housing 1 when the immobilizing member 2 is in position. The connection between the pressing part 3 and the cap 7 of the immobilizing member 2 is assured by a short resilient central pillar 8 allowing slight angular play between the pressing part and the cap.

An opening 9 extends the major part of the length of the pressing part 3, here near the central pillar 8, and opens laterally on either side of the pressing part. It enables the pressure exerted by said pillar to be applied to the pressing part proper at its longitudinal ends. An optimal pressure distribution is obtained in this way over the fiber portions immobilized by the pressing part in the groove 4 in the receiving housing.

The immobilizing member 2 includes means for fixing it to a receiving housing 1 complementary to the means that the latter comprises for this purpose.

In the embodiment shown, the longitudinal ends of the cap 7 include clipping lugs with detents 10, 10' respectively adapted to cooperate with the detents 6, 6' on the receiving housing 1.

The inwardly oriented detents 10, 10' are therefore also offset in height and in width and the detents 10' farthest from the upper part of the cap 7 are also wider than the detents 10, both being at least approximately the same width as the detents 6 or 6' with which they respectively cooperate.

It may be feasible to joint two fibers directly by means of the splicing module described hereinabove after inserting separately into the orifices 5 of the housing the two fibers previously stripped at the end over part of their length and each cleaved in a particular manner at that end.

This implies positioning the cleaved ends in the intended position before immobilizing them by moving the immobilizing member of the module from its first position to its second position.

To achieve this, the invention provides a jointing tool for carrying out the sequence of operations needed to perform the jointing in a continuous manner and by a single manipulation after initial positioning of the fibers and the splicing module on the tool.

Figure 9:
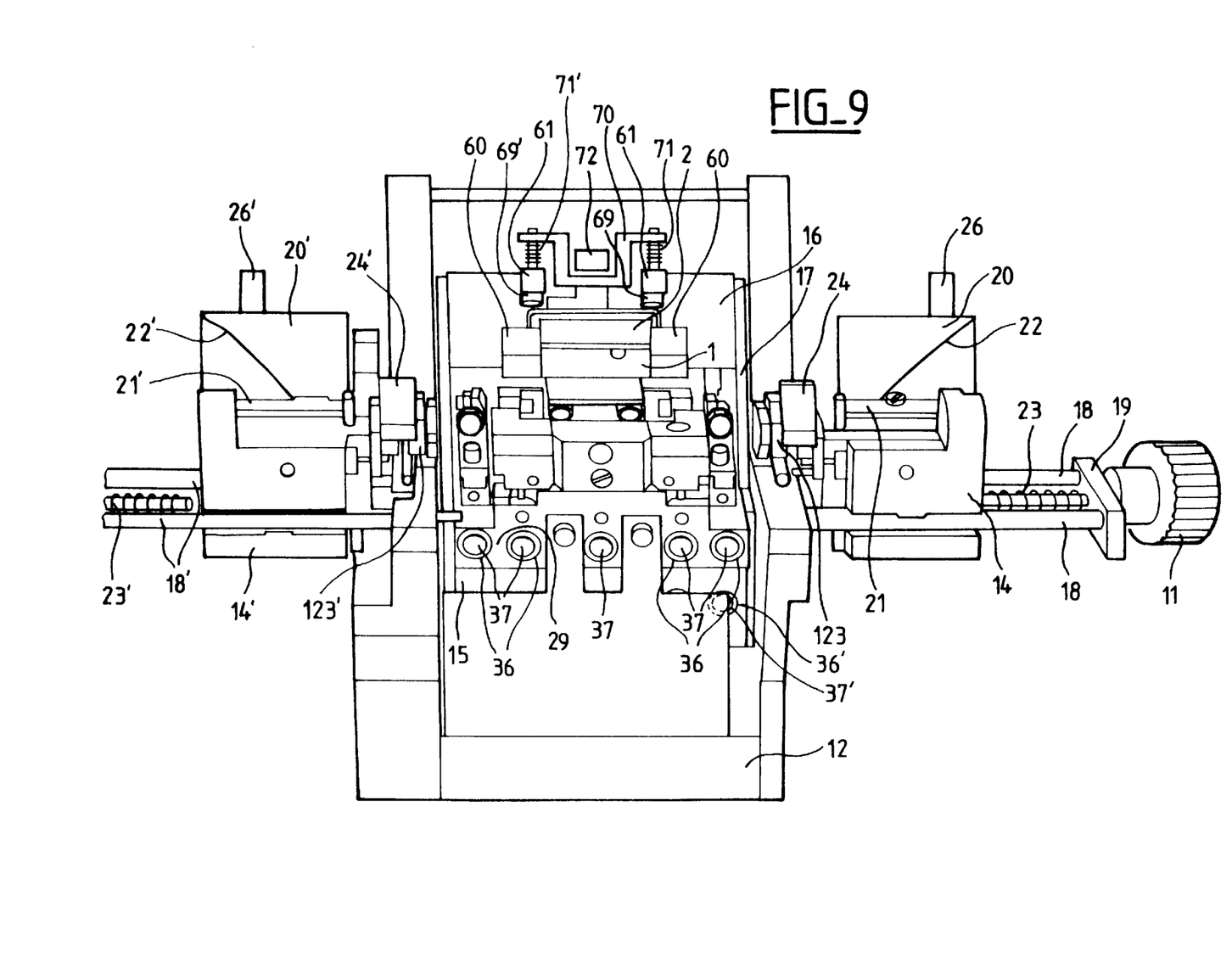
FIG. 9 is a first general view of a jointing and in particular splicing tool in accordance with the invention.

The jointing tool shown in FIG. 9 is operated by manual rotation to execute all of the operations of partial stripping of the ends of the fibers to be jointed, shaping of those ends by cleaving, insertion of the two fiber ends to be end-to-end jointed into their jointing position in a splicing module and mechanical immobilizing of these ends in the module after jointing to form a splice that can be handled independently of the tool, after first preliminary positioning of the fibers and a splicing module on the tool.

Rotary drive is imparted here by a member such as thumbwheel 11. Here the latter is situated at one end of the tool and, by continuous rotation in a particular, preferably non-reversible direction, drives a set of means for executing the various operations necessary to perform the jointing in a single cycle.

The thumbwheel 11 is mounted to rotate on a tool frame 12 and drives a shaft 13 carrying a plurality of actuator cams that cooperate with other functional members of the tool in a manner described hereinafter—see FIGS. 10 and 12. The thumbwheel 11 operates the shaft 13 through gears, as shown schematically in FIG. 10.

In a variant that is not shown, the shaft 13 can be rotated by an electric motor connected and controlled in an appropriate manner using techniques familiar to the skilled person.

Carrier means consisting of two fiber carrier carriages 14, 14' slide in opposite directions on either side of a central part of the frame 12 accommodating a subassembly 15 of means constituting tools for preparing fiber ends to be end-to-end jointed and a subassembly 16 of means for positioning, holding and maneuvering a splicing module as mentioned above.

Both the above subassemblies are mounted on a support cradle 17 pivoting in the frame 12 and moved by one of the cams from a first position, here an upper position, in which the tools referred to above are actuated to prepare the fiber ends to be jointed, to a second position, here a lower position, where the functional members of the second subassembly mentioned above are actuated to immobilize the end-to-end jointed fiber ends in a splicing module by maneuvering this module in such manner as to move its immobilizing member from its first position to its second position. The cam 56 for pivoting the cradle 17 can be seen in FIG. 12.

In the embodiment shown, each of the carrier carriages 14, 14' slides on two guide rods 18, 18' specific to it and fixed at one end to a common fastening member 19, 19' and at the other end to the frame 12.

The sliding of the carrier carriages 14, 14' is driven indirectly by the rotation of the thumbwheel 11 and the shaft 13 which drive two individual bell-shaped cylindrical cams 20, 20' for this purpose. The cylindrical cams 20, 20' fixed to the shaft 13 are on respective opposite sides of the frame 12. Each cooperates with a roller carried by a return plunger 21, 21' attached to the carrier carriage 14, 14' on the same side of the frame 12 as itself. Each plunger roller 21, 21' bears against the rim 22, 22' of the bell-shaped cam on the same side as itself relative to the frame 12, which bearing engagement is here maintained by the compressive action of a return spring 23, 23'—see FIGS. 9 and 10—disposed between the carrier carriage in question and the attachment member 19, 19' at one end of the guide rods 18, 18' carrying that carriage.

The respective rims 22, 22' of each of the two cylindrical cams 20, 20' are symmetrical about a median transverse plane XX of the shaft 13 that carries them and push the two carrier carriages 14, 14' symmetrically from an initial position in which the carriages are close to the frame 12 to a position of maximal separation of said carriages by movement parallel to the guide rods. The springs 23, 23' push the carriages towards the frame 12 and each causes the roller of the plunger 21, 21' of the carriage to be pressed against the profiled rim 22, 22' of the corresponding cylindrical cam 20, 20'. Rotation of the shaft 13 by the thumbwheel 11 pushes back the roller of each plunger which rolls on the largely sloping rim 22, 22' of the cam on which it bears, this rim being formed at the end of the cam, for example by cutting the initial cylinder of the cam to a specific profile common to the two cylindrical cams 20, 20'. This profile determines the successive positions of the carriages relative to the frame 12 on the guide rods 18, 18' according to the angular position of the shaft 13 rotated by the thumbwheel 11. Each plunger has an adjustment screw, not shown, opposite the roller for adjusting the position of the latter relative to the carriage carrying it.

Each carrier carriage 14, 14' is adapted to receive one of the two fibers to be jointed and includes a mobile fiber-carrier device 123, 123' that can pivot in the carriage about an axis which here is parallel to the guide rods. Each fiber-carrier, for example the carrier 123, includes a seat 123A adapted to receive a fiber and to position the longitudinal axis of one end of the receive fiber in a particular position in space, together with a fixing clamp 24, 24' for locally immobilizing this fiber end by means of a plane part on the seat where this clamp, hinged at one end, is hooked at its other end when manually operated during the insertion of one fiber end to be jointed.

In the embodiment proposed, each fiber to be jointed is placed on the seat of the fiber-carrier parallel to the guide rods in a plane area of this seat between two fiber locating Vees against which a complementary plane part of the clamp is pressed when the latter is hooked on. The two positioning Vees associated with a fiber locating seat are aligned and define a fiber locating axis aligned with that of the other fiber-carrier and parallel to the guide rods 18. Each fiber-carrier seat 123, 123' includes a rotation arm 25, 25' seen in FIG. 11 having a roller at one end adapted to bear on an outwardly oriented laterally projecting member 26, 26' of the cam 20, 20' and to cause the fiber-carrier that includes it to turn in a vertical plane, as already mentioned above. This rotation can be adjusted between 0° and about 20°, preferably between 0° and about 12°. Rotation of the fiber-carrier enables oblique cutting of the fiber in place in the fiber-carrier. No (i.e. 0°) rotation yields a right-angle cut of the fiber.

The clamp 24, 24' is unhooked from each fiber-carrier 123, 123' by means of a cam 27, 27' and a spring-loaded rod 28, 28' for each clamp, this releasing rod bearing on a heel-piece of the respective clamp to the rear of where the latter is hinged to its fiber-carrier when the rod and the clamp are correctly positioned relative to each other at the end of the jointing operation (see below).

Figure 10:
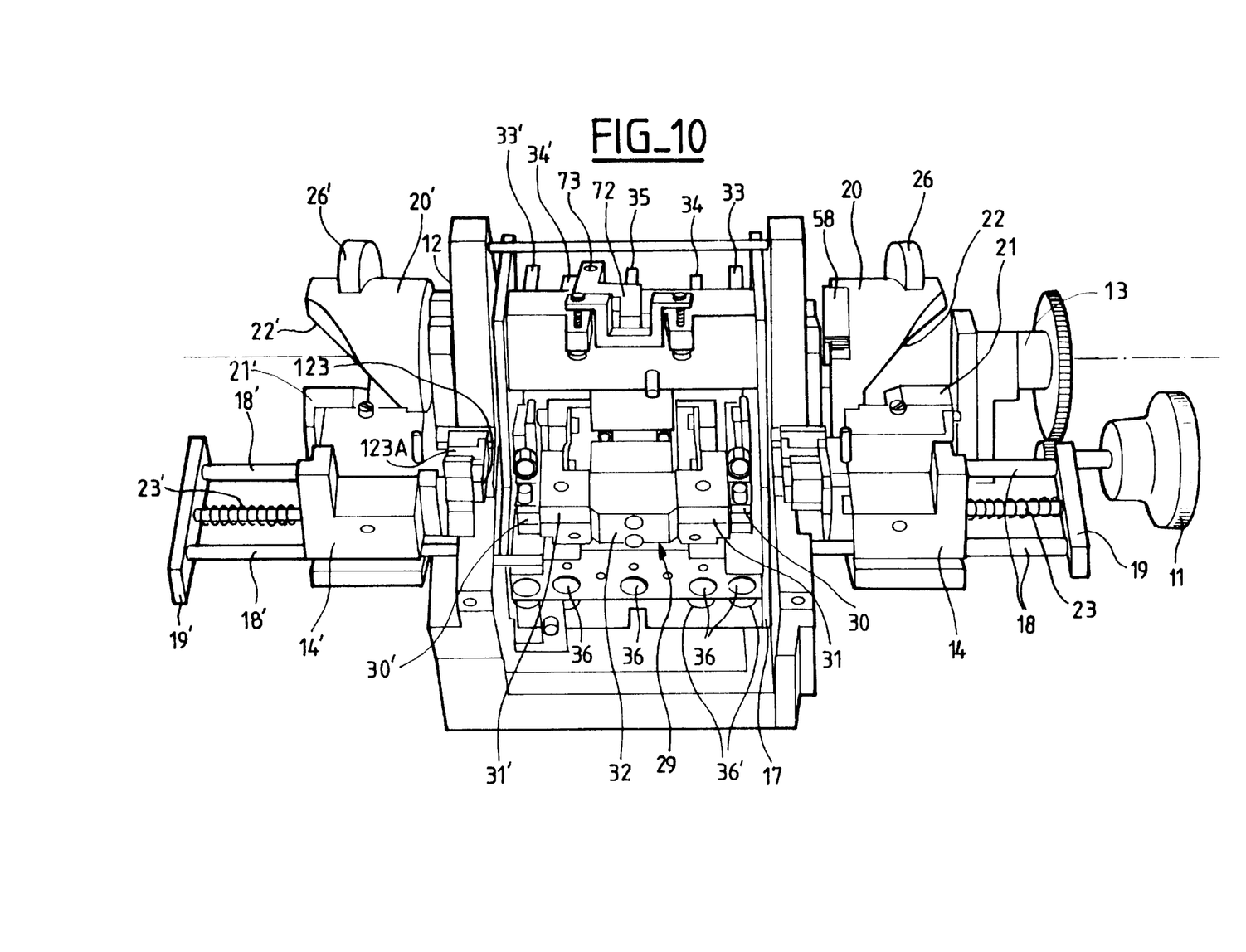
Figure 12:
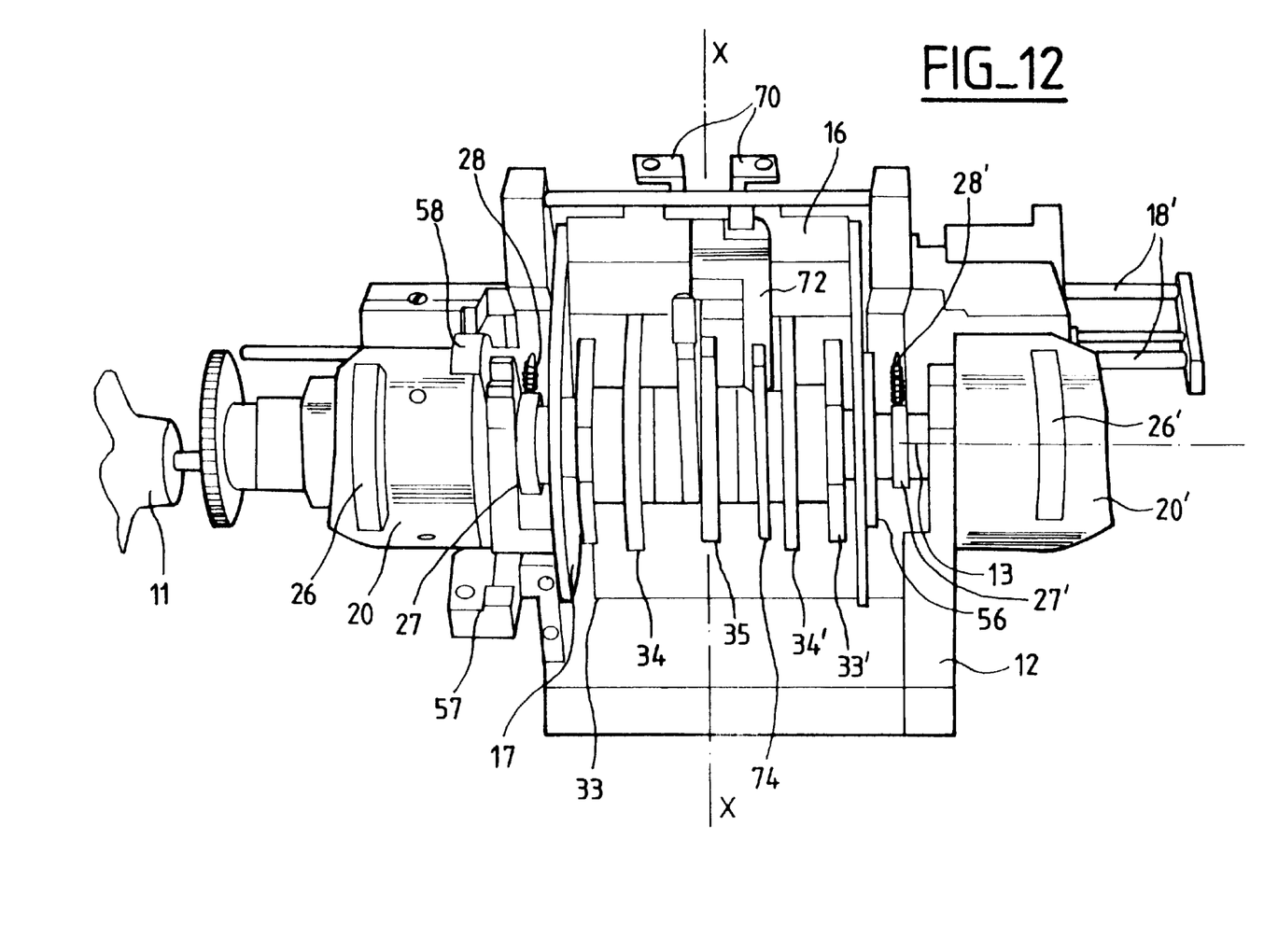
FIG. 12 is a rear view of the tool of the invention.

The subassembly 15 of means constituting tools for preparing the fiber ends to be end-to-end jointed is carried by the cradle 17 pivoting in the frame 12 and includes a shared arrangement 29 fixed to the cradle and carrying five arrangements 30, 30', 31, 31' and 32—see FIG. 10—movable in translation parallel to each other by flat cams 33, 33', 34, 34' and 35 carried by the shaft 13 (see FIG. 12). Each mobile arrangement 30, 30' cleaves the end of one of the fibers to be jointed in cooperation with the shared arrangement 29. The latter also contributes to partial stripping of the fibers, in cooperation with the arrangements 31, 31', and to clamping the fibers for stripping and cleaving, in cooperation with the arrangement 32. The latter is centrally located between the arrangements that 31, 31' which are aligned with the arrangements 30, 30' at the ends of the subassembly comprising all these arrangements. All these arrangements are mobile in translation transversely to the shaft 13 on the shared arrangement 29 that carries them.

In the proposed embodiment, the shared arrangement 29 has cylindrical guides with orifices 36, 36' seen in FIGS. 9, 10 and 11 which receive guide rods 37, 37' for the arrangements 30, 30', 31, 31' and 32. In the example shown, the guide rods 37 have a circular cross-section and slide in guides with a complementary circular cross-section and the rods 37', have a circular cross-section and slide in non-circular guides assuring both accurate horizontal guidance and play in the vertical direction.

Each of the aforementioned arrangements is moved by one of the cams 33, 33', 34, 34' and 35 specific to it and onto the profiled rim of which it is pressed by a plunger with a roller similar to the return plunger 21 mentioned above.

The mobile clamping arrangement 32 and the complementary part of the shared arrangement 29 are shown in FIGS. 13 and 14. They include two horizontal mobile jaws 38, 38' symmetrical about a median transverse plane XX mentioned above and each adapted to clamp one of the fibers to be jointed against a common fixed jaw 39.

In the proposed embodiment, this jaw 39 projects into a void between the arrangements 29 and 32 into which the mobile jaws 38, 38' also project. The latter are mounted on rods 40, 40' carrying springs, e.g. the spring 41, whereby they are pressed elastically against the fixed jaw 39 when the arrangement 32 carrying them is moved towards the shared arrangement 29 by the cam 35. To this end the arrangement 32 bears on the profiled rim of the cam 35 via a roller 42S carried by a plunger 43S with an adjustment screw 44S retained in a housing of complementary shape into which this plunger can move in translation over a limited distance. The roller 42S is pressed against the cam 35 when it has moved in translation as far as the bottom of its housing, because of the opposite pressure exercised by a return spring 45S mounted between the arrangements 29 and 32 on a guide rod 37S. The arrangement 32 slides opposite the shared arrangement 29 and includes two guide rods 37S, 37'S that cooperate with cylindrical guides with orifices 36, 36' of the shared arrangement 29, these guides being of the same construction as those already mentioned in connection with the shared arrangement 29.

In a preferred embodiment, thin rigid fiber disengagement rods 46, 46', obtained by bending two metal wires of which one is fixed to the shared arrangement 29 and the other to the arrangement 32, are positioned to intersect the trajectory of a fiber portion that may have remained pressed against one of the jaws after cleaving when such clamping is removed by the mobile jaws 38, 38' returning to an initial position in which they are far away from the fixed jaw 39. This enables both ends of each of the rods 46, 46' in the void between the arrangements 29 and 32 to detach any cut fiber portion remaining pressed against one of the jaws, either when the latter move relative to the rod ends 46 in so far as this rod 46 fixed to the shared arrangement 29 and the mobile jaws 38, 38' are concerned, or relative to which these rod ends 46' move in so far as the fixed jaw 39 and the rod 46' are concerned.

Figure 15:
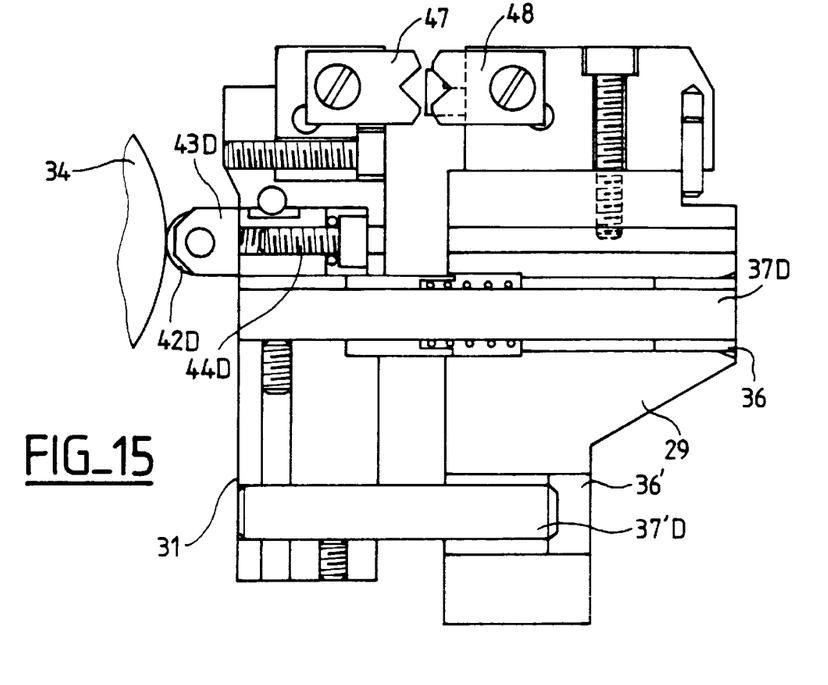
FIGS. 15 and 16 are respectively a lefthand side view of one of the stripping arrangements for tools in accordance with the invention and a top view showing the two stripping arrangements of a tool in accordance with the invention.
Figure 16:
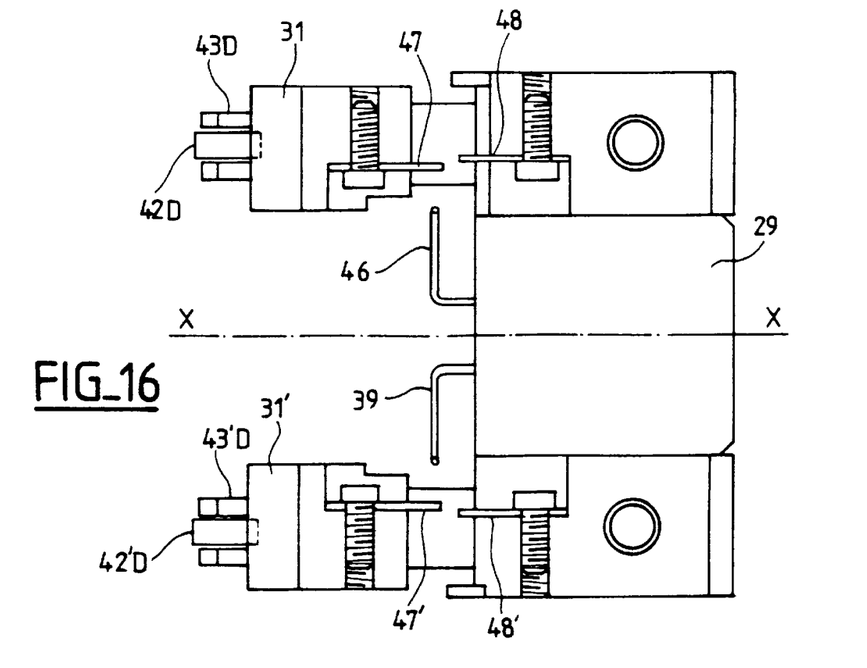

The mobile stripping arrangements 31, 31' and the complementary part of the shared arrangement 29, as shown in FIGS. 15 and 16, have complementary stripping blades symmetrical about a median transverse plane XX already mentioned above, like the arrangements 31 and 31'. These stripping blades, identified by the reference numbers 47, 47' when they are part of the arrangements 31, 31' and by the reference number 48, 48' when they are carried by the shared arrangement 29, are planar with a V-shape stripping edge, as can be seen in FIG. 15. Here they are positioned so that the hollow of the V-shape is positioned transversely or comes to be positioned transversely to receive a fiber to be stripped along an axis defined for these fibers by the carrier carriages 14, 14' when the arrangements 31 and 31' are simultaneously moved towards the shared arrangement 29. This is brought about the identical cams 34, 34', on the shaft 13 which operate on plungers 43D, 43'D carrying rollers 42D, 42'D when the shaft turns. The components associated with the plunger 43D, 43'D are similar to those associated with the plunger 43S. They are designated by the same reference numbers as in FIGS. 13 and 14 with the letter D added. Each roller 42D, 42'D follows the profiled rim of the cam 34, 34' on which it bears so as to move the arrangement 31, 31' including it in translation relative to the shared arrangement 29 to allow temporary cooperation of the stripping blades of these arrangements when moved towards each other for stripping the fibers between two periods in which these arrangements and the stripping blades that they carry are far apart.

The symmetrical cleaving arrangements 30 and 30' are symmetrical about the median transverse plane XX mentioned above, each between one of the stripping arrangements 31, 31' and a respective side of the cradle 17. FIGS. 17 and 18 show the respective dispositions of one of them, in this instance the arrangement 30, and the corresponding part of the shared arrangement 29.

Each cleaving arrangement includes a cutting diamond, such as the diamond 49 in the case of the cleaving arrangement 30, which it moves towards the shared arrangement 29 when it is moved towards the latter by the corresponding cam, the cam 33 in this instance, until it intersects the axis of the fiber defined by the corresponding fiber-carrier, here the fiber-carrier 123, and possibly the fiber to be jointed held by this fiber-carrier and by the jaws, here the jaws 38 and 39, of the clamping arrangement 32 and of the complementary part of the shared arrangement 29 between which the fiber is immobilized at this time.

Each diamond is here immobilized by an immobilizing member 50 fixed by a screw 51 to a support 52 accurately located on the cleaving arrangement which carries it and to which it is fixed by a screw 53. The possibility of contact with the free and cutting end of each diamond is limited except for the fiber to be cleaved, in particular by the protection member 54 facing the cutting end of the diamond 49 (see FIGS. 17 and 18). An additional protection plate 55 (not shown in FIG. 18) is placed laterally relative to the diamond on the corresponding support (see FIG. 17).

Simultaneous movement of the cleaving arrangements relative to the shared arrangement 29 is driven by the respective cam 33, 33' in a manner that is similar in principle to that employed for the stripping arrangements, the active profiles of the cleaving cams being of course different from those of the stripping cams 34, 34' in that the operations to be effected are different.

In the present instance the operation to be performed is for each diamond to strike laterally the fiber held taut between the nearest fiber-carrier device 123 or 123' and the clamping jaws 39 and 38 or 38' at the center of the tool to cleave the fiber.

To this end, each cleaving arrangement includes a plunger having a roller, for example the plunger 43C having a roller 42C seen in FIGS. 17 and 18.

The plungers are mounted on the cleaving arrangements including them in a manner corresponding at least approximately to those employed for the plungers 43D or 43S included in the respective arrangements 31, 31' and 32.

As mentioned above, with reference to FIGS. 9 through 12, the subassemblies 15 and 16 are mounted on a cradle 17 pivoting in the frame 12 about the shaft 13 relative to which the cradle turns. The cradle 17 is pivoted by a cam 56 between the cam 20' and the cradle 17 on the shaft 13 carrying them. To this end an arm, not shown, is hinged to the frame 12 and one end bears on the profile of the cam 56 through a roller, not shown, the other end being attached to the cradle.

The cradle 17 is held mechanically in the upper position during a first part of the rotation of the cam 56 by virtue of the profile of the rim of the latter to enable preparation of the fibers by the tools included in the subassembly 15 prior to jointing.

The cradle 17 pivots into the lower position, under its own weight as soon as the profile of the cam 56 allows this by allowing the roller carried by the arm to move towards the axis of the shaft 13 during a second part of the rotation of the cam 56.

In one embodiment the movement of the cradle 17 from the upper position to the lower position due to its own weight is slowed by a brake member 57 attached to the frame 12 rubbing on an increased thickness portion 58 with a progressive profile on the cylindrical cam 20 near the frame, this member and this additional thickness portion being shown in part in FIG. 12. The additional thickness portion 58, also shown in FIG. 10, is covered with a non-skid coating for improved braking.

Pivoting of the cradle into the lower position, simultaneously with the downward movement of the subassembly 15 previously at this level, positions the subassembly 16 at the level of the fibers as defined by the fiber-carrier devices 123 and 123'.

The subassembly 16 essentially comprises a support member corresponding to the part 16 in FIG. 9. This support member is fixed to the upper part of the cradle 17 and receives a splice module carrier 60 which is preferably removable and which accommodates and locates a jointing module as described above.

Because the module carrier is removable, it is possible to accommodate modules other than those described above by the use of module carriers compatible with the support member included in the subassembly 16, these module carriers being adapted to allow the use of such modules in this case, as explained in more detail hereinafter.

The support member of the subassembly 16 also accommodates a crimping device with plungers 61 positioned above the module carrier 60 when the latter is in place.

In one embodiment the module carrier 60 includes a metal receiving part 62 shown in detail in FIGS. 19, 20 and 21. This receiving part includes a longitudinal housing enabling it to accommodate a splicing module consisting of a receiving housing 1 and an immobilizing member 2. Here this housing is delimited by a smooth wall 63 against which the module is positioned and by two end cavities 64 which each receive one end of the module, the latter being positioned accurately within these cavities into which it is inserted by sliding along the smooth wall until it abuts the bottom of the cavity.

Two symmetrical orifices 65 at respective opposite ends of the cavity open to the exterior of the part at the ends of the latter and consequently enable the insertion of a fiber into the receiving housing 1 of a module via one of the orifices S in the receiving housing.

In the envisaged embodiment, these orifices 65 preferably have an outwardly widening inlet to facilitate the insertion of a fiber and are also each open laterally by virtue of a longitudinal slot 66 opening towards the exterior in a direction opposite that in which a module is inserted into a receiving part 62 of the module carrier 60. These slots 66 allow the passage of two fibers connected to an assembled module when the module is dissociated from the receiving part 62 after jointing the fibers.

In the envisaged embodiment, the receiving part 62 is fixed against a front wall of the support member of the subassembly 16 in such a manner as to be removable and two conduits 67 and 67' are provided in the receiving part 62 to receive two rods 68 and 68' for positioning this receiving part 62 in corresponding conduits, not shown. In a preferred embodiment, at least one of the rods 68, 68' and one of the conduits are adapted in a manner known to the skilled person to assure a clipping action for immobilizing the removable receiving part 62 against the front wall of the support member against which it has been pushed and to remove it manually therefrom if required. In particular, this enables replacement of the receiving part 62 mentioned above with a similar part designed for a different module for splicing two fibers or a module for jointing a fiber to another member, for example an optical connector endpiece.

The crimping device with plungers here includes two plungers 61 (FIG. 9) positioned above the module holder 60 on the front wall of the support member of the subassembly 16 and in particular facing the longitudinal ends of an immobilizing member 2 of a splicing module in place in the module carrier 60 so that it is able to press on its ends. Here each of these plungers includes a bearing member 69 or 69' fastened to a rod that slides in an orifice provided for it in one end of a U-shape support bracket 70 (see FIG. 9 in particular).

The two rods are secured to the bracket 70 in a manner known to the skilled person so as to be able to slide relative to the bracket without being able to escape from it, and are associated with return springs 71, 71'. The bracket 70 is actuated by a first end of a mobile arm 72—see FIGS. 9 through 1—which is hinged to the support member of the subassembly 16 and which carries a roller 73 at its other end. The roller 73 bears on the rim of a plane cam 74 carried by the shaft 13. The profile of the cam 74 is shaped in a manner known to the skilled person so that the rotation of the shaft 13 at the end of the cycle successively crimps the fibers into the splicing module by virtue of the simultaneous bearing engagement of the plungers 69 and 69' with the ends of the immobilizing member 2 of a splicing module in place in the receiving part 62 of the module carrier and the subsequent return to their initial position of the plungers to eject the splicing module connected to the two fibers jointed by means of it.

The process is of course similar if the receiving part and where applicable the plunger(s) and/or the bracket are different from those shown in that these parts are then adapted to suit a splicing or jointing module different to that shown here by way of non-limiting example.

Splicing two fibers by means of the tool briefly described above, in particular by means of a splicing module comprising a receiving housing 1 and an immobilizing member 2 as described above, entails the successive execution of the operations described hereinafter.

As already mentioned previously, the jointing tool is designed to carry out the necessary sequence of jointing operations in a single rotation cycle of the shaft 13 by means of the thumbwheel for driving the mobile functional members of the tool, apart from initial positioning of the fibers and the splicing module on the tool.

To this end, a splicing module is first placed in the receiving part 62 of a module carrier either already in place on the jointing tool that includes it or possibly before positioning of the receiving part 62 on the tool, with the operating thumbwheel 11 in an initial position which enables a fiber jointing cycle to be started. The cradle is then in its upper position in which the subassembly 15 is at the level of the fibers and the subassembly 16 is above them.

At this stage the fibers to be jointed—or where applicable the single fiber to be jointed—is positioned by means of the module on the seat of a fiber carrier 123 or 123' with a free end of the fiber or fibers positioned level with the clamping jaws at the center of the tool between which the end in question will subsequently be immobilized.

Each fiber is then positioned manually in the manner indicated above by the operator using the tool, the fiber passing across the bottom of the locating Vees surrounding the seat of the fiber carrier 123 or 123' that receives it, before it is immobilized by manually closing and clipping the clamp 24 or 24' associated with this fiber-carrier.

The operating thumbwheel 11 can be rotated in only one direction, by virtue of a freewheel type mechanism not shown, and its rotation causes, in a first phase, simultaneous displacement of the stripping blades 47 and 47' which move towards the stripping blades 48 and 48' until they come into contact with the respective fibers positioned between the blades 47 and 48 and between the blades 47' and 48'. At the same time the fiber carrier carriages 14, 14' move apart relative to the central part of the frame 12 and consequent movement in opposite directions of the fibers, one of which rubs against the blades 47, 48 and the other against the blades 47', 48', strips the fibers in the rubbing area.

Further rotation of the thumbwheel 11 and consequently of the shaft 13 cause, in a second phase, the simultaneous withdrawal of the arrangements 31 and 31' and therefore that of the stripping blades 47, 47' because of the shapes of the corresponding profiles of the cams 34, 34' on which the rollers of these arrangements bear. Simultaneously, or quasi-simultaneously, the respective movements away from each other of the fiber carrier carriages 14, 14' are halted because of the shape of the corresponding profiles 22, 22' of the cylindrical cams 20, 20'. This is immediately followed by the simultaneous clamping of each of the fibers as a result of the simultaneous movement of the jaws 38, 38' towards the jaw 39 by virtue of the movements of the mobile clamping arrangement 32 relative to the shared arrangement 29 by the cam 35 driven by the shaft 13.

Further rotation of the shaft 13 by the thumbwheel 11 causes, in a third phase:

tensioning of the portion of each fiber between a fiber-carrier device 123 or 123' and the jaws 39 and 38 or 38' and held by the latter;

twisting of each of these fiber portions each subjected to the partial rotation of the respective fiber-carrier device to which it is temporarily secured.

To this end, the rotation of the cams 20 and 20' carried by the shaft 13 causes, simultaneously:

further movement apart of the carrier carriages 14, 14' and therefore of the fiber-carrier devices relative to the frame and consequently the clamping arrangement 32 including the jaws 38, 38' and 39;

partial rotation of each of the fiber-carriers 123, 123' by the projecting member 26 or 26' of the cam 20 or 20' as it rotates to cause its movement.

A fourth phase, brought about like the previous ones by rotation of the shaft 13 by the thumbwheel 11, commands the cleaving of each of the fibers by one of the cutting diamonds that strikes the fiber laterally because of the movement in translation of the cleaving arrangement 30 or 30' that includes it while the fiber-carrier carriages continue to apply tension to the fiber portions in the cleaving areas by virtue of the profiles of the cams 20, 20'.

These movements in translation of the cleaving arrangements 30, 30' towards the shared arrangement 29 are the consequence of the rotation of the cams 33, 33' caused by that of the shaft 13.

The axial traction applied to each fiber by the fiber-carrier carriage 14 or 14' in the fiber-carrier device 123 or 123' in which it is immobilized and the torsion exerted by this device combined with the force due to the impact of a diamond on the fiber causes the fiber to break at the point of impact with an oblique cleavage at an angle of about 5°, for example. This oblique cleavage is intended to eliminate reflection phenomena that would otherwise occur when the fiber is end-to-end jointed to another identical or optically compatible fiber.

The movement away from each other of the carrier carriages 14, 14' then stops because of the change in the profile of the cams 20, 20' provided for this purpose and the clamping jaws 38, 38' move away from the fixed jaws 39 because of the action of the cam 35 driven by the shaft 13 with all the other cams, as previously, during a fifth phase. The respective movement apart of each of the jaws 38, 38' then moves one end of one of the rods 46 or 46' to the level at which there may be a fiber portion that was previously immobilized between the fixed jaw 39 and one of the jaws 38 or 38' and separated by the cleaving operation from the remainder of the fiber of which it was previously part. This portion is then separated from the jaw against which it has been pressed until this time, if it has not fallen off under its own weight, by pressing one rod end 46 or 46' onto it.

Further rotation of the shaft 13 then causes the cam 56 to pivot the cradle 17 in the frame 12 from its upper position to its lower position. This positions the subassembly 16 at the level of the fibers as defined by the fiber-carrier devices 123, 123', the latter pivoting to their initial position due to the withdrawal of the projecting members 26, 26' by virtue of the rotation of the shaft 13 and the cam 20, 20'.

The arrival of the subassembly 16 at the lower position causes the receiver housing 1 of the splicing module housed in the module-carrier 60 of the jointing tool to be positioned at a level such that the axis of the fiber insertion orifices 5 of said housing 1 are aligned with the fiber axis defined by the fiber-carrier devices 123, 123'. The respective cleaved ends of the two fibers carried by these devices are therefore each aligned with one of the two orifices 5 in the receiving housing 1.

After or simultaneously with this sixth phase, the rotation of the shaft 13 and in particular that of the cams 20, 20' moves the carrier carriages 14, 14' towards the frame and consequently inserts into the orifices 5 of the receiving housing 1 the cleaved ends of the two fibers carried by the fiber-carrier devices 123, 123'.

The profile of the cams 20 and 20' is established in a manner known to the skilled person so that the cleaved ends of the two fibers are pressed together in the receiving housing 1 when the cams have returned the two carrier carriages 14, 14' to a particular distance from their initial position near the frame.

Following this seventh phase, further rotation of the shaft 13 causes the cam 74 to press the plunger 69 onto the ends of the immobilizing member 2 of the splicing module in place in the receiving part 62 of the module-carrier 60 via the mobile arm 72 of the crimping device.

The immobilizing member 2 has until this time been in a first position relative to the receiving housing 1 of the module that includes them to enable the fibers to pass between it and the bottom of the cavity in the receiving housing 1; it now moves to the second position in which it presses on the ends of the fibers inserted into the cavity mentioned above via the orifices 5 at the ends of this cavity to hold them in place.

After this eighth phase, further rotation of the shaft 13 causes the cams 27 and 27' attached to this shaft to release the fibers from the fiber-carriers 123 and 123' by virtue of the rods 28, 28' unhooking the associated clamps 24 and 24' by pressing on the heel-pieces of the latter.

Finally, rotation of the shaft 13 in a final phase of the splicing cycle causes the cam 56 to raise the cradle 17 to the upper position which causes the module-carrier 60 to return to its initial position and the jointed splicing module to be offered up in an upper position facilitating withdrawal of the module and where applicable of the module-carrier 60.

The jointing tool is then ready for a further cycle.

It must be understood that it is possible to use a tool of the above kind to joint two fibers to other splicing modules compatible with what is described here with virtually no modification other than changing the module-carrier. It is also possible to use a tool of the above kind for a joint involving only one fiber, for example to connect a fiber to a connector end-piece, with minimal modifications including in particular a change of module-carrier.

Note also, in relation to the cleavage phase, that the fibers can be cut at a right angle, instead of obliquely, by eliminating the torsion applied to the fiber or fibers.

Furthermore, the tool described in the form of a double tool can be converted into a single tool by eliminating one of the two parts symmetrical about the axis XX and retaining the central cam 35 previously mentioned.

Of course, the various cams then have the appropriate profiles for adjusting the stripping length of the fiber or fibers and executing the required clamping and cleavage.

There is claimed:

1. A tool for end-to-end jointing one of a first fiber and an optical connector end-piece to a second fiber including:

a removable jointing module comprising a receiving housing for receiving said second fiber to be end-to-end jointed and an immobilizing member being movable relative to said receiving housing from an initial position for allowing free insertion of said second fiber into said receiving housing to a second position for immobilizing said second fiber in the receiving housing;

stripping means for partially stripping at least an end part of said second fiber to provide a stripped portion lengthwise said end part; end cleaving means for cleaving said stripped portion;

at least one movable fiber carrier means for holding and moving at least said second fiber to be end-to-end jointed relative to said stripper, said end cleaver and said receiving housing; and a rotary drive shaft for sequentially controlling said at least one movable fiber carrier means, said stripper, said end cleaver and said mobilizing member so as to carry out stripping, cleaving, end-to-end jointing and end-to-end immobilizing operations successively in a rotation cycle of said drive shaft.

2. The jointing tool claimed in claim 1 including a first subassembly comprising said stripping means and said end cleaving means for preparing said second fiber end to be end-to-end jointed and actuating means coupled to said drive shaft for actuating said stripping means and said end cleaving means, a second subassembly comprising a positioning support for receiving said jointing module, said subassemblies being staggered on a common support cradle pivotally mounted in a frame on either side of which are mounted said at least one movable fiber carrier means, said at least one movable fiber carrier means comprising two fiber carriers movable in translation in opposite directions on respective opposite sides of said frame by main cams fixed to said shaft rotatable relative to said frame, said shaft being rotated by a rotary operating member of said tool and providing a pivot axis for said support cradle which pivots under it own weight and under the control of a pivot cam fixed to said shaft from a first position in which said first subassembly is at the level of said second fiber as defined by said at least one movable carrier means and a second position in which said jointing module is positioned at the level of said second fiber as determined by said at least one movable fiber carrier means, said pivot cam pivoting said support cradle from said second position to said first position.

3. The jointing tool claimed in claim 2 wherein said fiber carriers are in the form of two carriages which are caused to slide on guide rods fixed to said frame on respective opposite sides thereof against return springs by individual main cams fixed to said shaft on respective opposite sides of said frame, each carriage carrying a fiber-carrier device movably and pivotably mounted in said carriage so as to be able to be turned about an axis parallel to said guide rods by a rotation arm bearing on a laterally projecting member carried by said main cam through the intermediary of which said carriage carrying said fiber-carrier device is moved.

4. The jointing tool claimed in claim 3 wherein each fiber-carrier device has a flat seat on respective opposite sides of which are fiber locating Vees and a hinged fixing clamp for fixing a fiber in a manually releasable position; said clamp being mechanically released by an unlocking cam mounted on said shaft and a rod adapted to bear on a release heel-piece of said clamp.

5. The jointing tool claimed in claim 2, wherein said first subassembly includes fiber clamping means, said stripping means and said end cleaving means being aligned successively on respective opposite sides of said fiber clamping means, and said fiber clamping means, said stripping means and said end cleaving means fixedly mounted on said cradle and comprising mobile arrangements, said mobile arrangements being moved in translation against return springs by individual clamping, stripping and cleavage cams fixed to said shaft rotated by said rotary operating member of said tool.

6. The jointing tool claimed in claim 5, wherein said at least one movable fiber carrier means positions said second fiber axially, locally immobilizes said second fiber, and cooperates with said stripping means to strip a portion of said second fiber by virtue of movement of said carrier means in translation and with said end cleaving means to assure cleavage of the end of said second fiber by virtue of traction while said second fiber is held at the end by said fiber clamping means.

7. The jointing tool claimed in claim 5 wherein said fiber clamping means include two jaws mobile in translation relative to a common fixed jaw and associated with thin rigid fiber release rods respectively attached either to said arrangement carrying said fixed jaw or to said arrangement carrying said mobile jaws so as to intersect the path of any fiber portion that may have remained pressed against one of said jaws after cleavage when said clamping means is removed by virtue of said mobile jaws returning to an initial position in which they are far away from said fixed jaw.

8. The jointing tool claimed in claim 2 wherein said second subassembly includes support means for positioning said jointing module at the level of the axis of said second fiber as determined by said fiber carrier to enable insertion of said second fiber by movement in translation into said jointing module and clamping means with plungers for moving said immobilizing member between said initial position and said second position, wherein in said second position pressing means of said immobilizing member are pushed to the bottom of a cavity so as to immobilize said second fiber situated between said pressing means and said bottom of said cavity.

9. The jointing tool claimed in claim 8, further including support means for a jointing module, wherein one of said support means for a jointing module and said connector member is manually removable from said second subassembly.

10. The jointing tool claimed in claim 2, wherein said second subassembly further comprises pressing means including plungers for pushing the immobilizing member into said receiving housing and actuating means coupled to said drive shaft for actuating said pressing means.

11. The jointing tool claimed in claim 1 wherein said rotary drive shaft is rotated by a manual rotary operating member.

12. The jointing tool claimed in claim 1 wherein said rotary drive shaft is rotated by an electric motor.

13. The tool set forth in claim 1, wherein said stripping means further includes means for partially stripping at least two fibers successively and simultaneously.

14. A tool for end-to-end jointing one of a first fiber and an optical connector end-piece to a second fiber by means of a module, said module including:
    a removable jointing module comprising a receiving housing having an opening at one end for receiving said second fiber and an immobilizing member being movable relative to said receiving housing from an initial position for allowing free insertion of said second fiber into said receiving housing to a second position for immobilizing said second fiber;
    a stripper which partially strips said second fiber to provide a stripped portion;
    an end cleaver which cleaves said stripped portion of said second fiber;
    at least one movable fiber carrier for holding and moving said second fiber to be end-to-end jointed relative to said stripper, said end cleaver and said receiving housing; and
    a rotary drive shaft for sequentially controlling said at least one movable fiber carrier, said stripper, said end cleaver and said immobilizing member so as to carry out stripping, cleaving, end-to-end jointing and end-to-end immobilizing operations successively in a rotation cycle of said drive shaft.

15. A method of end-to-end jointing one of a first fiber and an optical connector end-piece to a second fiber, comprising the steps of:
    placing a jointed splicing module in a receiving part of a module carrier;
    positioning at least one fiber on a fiber carrier;
    immobilizing an end of said at least one fiber in said fiber carrier;
    rotating a drive shaft so as to cause stripping blades to strip said at least one fiber in a rubbing area;
    further rotating said drive shaft so as to clamp said at least one fiber between jaws;

further rotating said drive shaft so as to obliquely cleave one end of said at least one fiber with a cutter to provide a cleaved end;

further rotating said shaft so as to position a receiver housing, whereby a fiber insertion orifice of said receiver housing is aligned with the cleaved end of said at least one fiber;

further rotating said shaft so as to insert said cleaved end of said at least one fiber into said orifice of said receiver housing and to press said at least one fiber against said one of a first fiber and an optical connector end-piece, whereby said at least one fiber is jointed to said one of a first fiber and an optical connector end-piece;

further rotating said shaft so as to cause cams attached to said shaft to release said at least one fiber from said fiber carrier and move an immobilizing member to a position at which it presses and holds said at least one fiber in said orifice; and further rotating said shaft to as to move said joined splicing module to a position in which said joined splicing module can be removed from said module carrier.

16. The method of claim 15, further including the step of rotating said drive shaft so as to tension and twist said at least one fiber between a fiber carrier device and said jaws.

17. A tool for end-to-end jointing one of a first fiber and an optical connector end-piece to a second fiber, said tool comprising:

a splice module movable along an axis in said tool, said splice module comprising,
   a receiving housing which receives said second fiber to be jointed to said one of a first fiber and an optical connector end-piece; and
   an immobilizing member, said immobilizing member being movable between a first position in which said second fiber can be freely inserted into said receiving housing, and a second position in which said second fiber is fixed in said receiving housing;

a subassembly for stripping an end of said second fiber to provide a stripped portion and cleaving said stripped portion of said second fiber;

pressing means for end-to end jointing said second fiber to said one of a first fiber and an optical connector end-piece; and a rotary drive shaft which drives said tool so as to control end-to-end jointing of said one of a first fiber and an optical connector end-piece to said second fiber by controlling stripping, cleaving and positioning of said second fiber and positioning of said immobilizing member.

\* \* \* \* \*